United States Patent [19]
Merrow et al.

[11] 3,941,458
[45] Mar. 2, 1976

[54] CATOPTRIC LENS ARRANGEMENT

[75] Inventors: Earle F. Merrow, Billerica; Werner R. Rambauske, Carlisle; Philip J. McFarland, Lynnfield, all of Mass.

[73] Assignee: Raytheon Company, Lexington, Mass.

[22] Filed: Jan. 20, 1975

[21] Appl. No.: 542,473

Related U.S. Application Data

[63] Continuation of Ser. No. 375,563, July 2, 1973, abandoned.

[52] U.S. Cl............. 350/294; 240/41.35 C; 350/299
[51] Int. Cl.².......................................... G02B 5/10
[58] Field of Search ........... 350/288, 293, 294, 296, 350/299; 240/41.35 R, 41.35 C, 41.37

[56] References Cited
UNITED STATES PATENTS

| 525,571 | 9/1894 | Ainslie............................. 350/296 |
| 3,492,474 | 1/1970 | Yamaguchi et al................. 350/293 |
| 3,745,325 | 7/1973 | Harvey............................ 350/299 X |

FOREIGN PATENTS OR APPLICATIONS

| 497,181 | 8/1950 | Belgium............................. 350/293 |
| 725,509 | 3/1955 | United Kingdom................. 350/293 |

*Primary Examiner*—Alfred E. Smith
*Assistant Examiner*—F. L. Evans
*Attorney, Agent, or Firm*—Philip J. McFarland; Joseph D. Pannone

[57] ABSTRACT

Improved catoptric lens arrangements to form beams from the energy emitted by extended sources of wave propagated energy are disclosed. All embodiments utilize at least a pair of mirrors disposed along a common axis, one of such mirrors being convex and the other concave, the generatrices of the reflecting surfaces of such mirrors being curves with noncoincident focal points, such generatrices being always divergent. At least one source of wave propagated energy is disposed between such reflecting surfaces so that all of the wave propagated energy from such a source is reflected back and forth between the mirrors in passing to an exit aperture defined by the mirrors.

2 Claims, 3 Drawing Figures

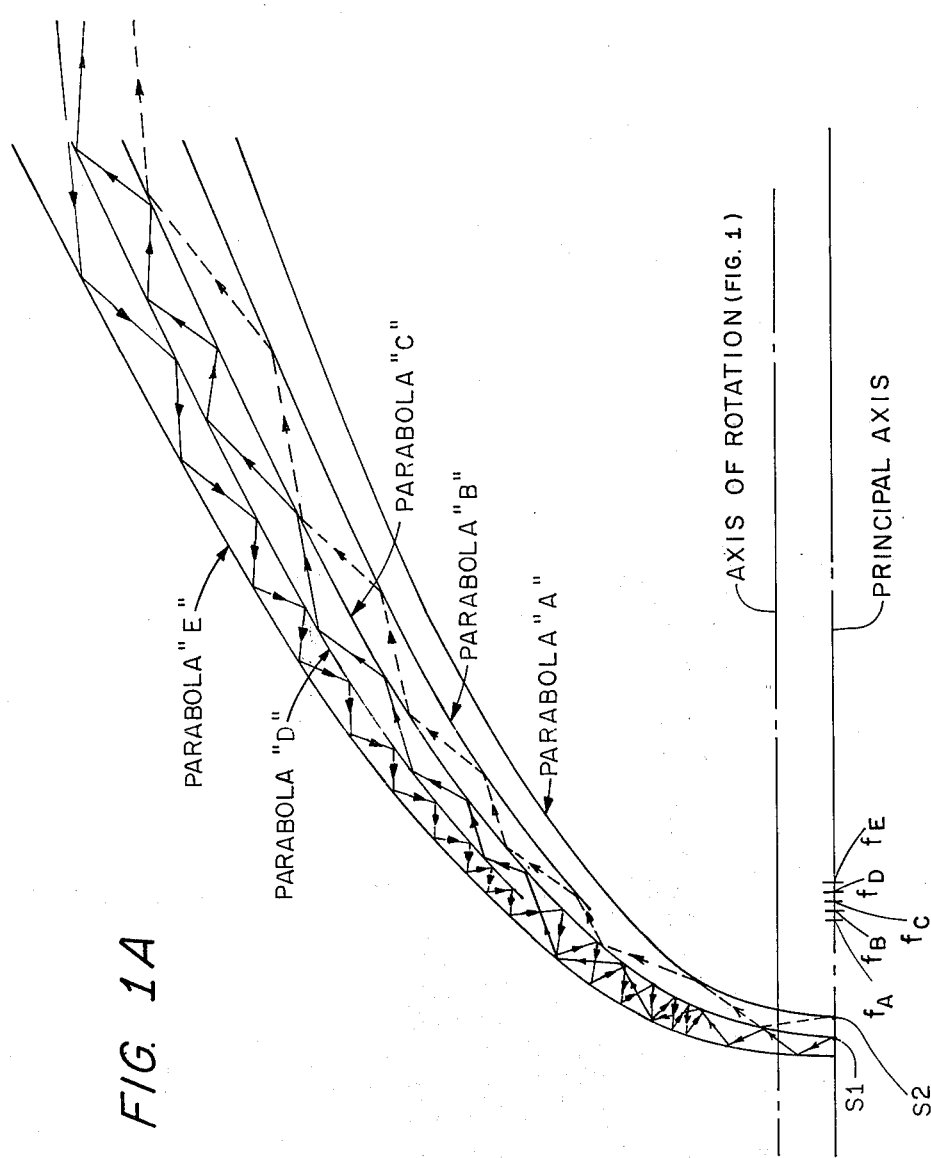

CATOPTRIC LENS ARRANGEMENT

CROSS-REFERENCE TO RELATED CASES

This is a continuation of application Ser. No. 375,563, filed July 2, 1973 now abandoned.

BACKGROUND OF THE INVENTION

This invention pertains generally to catoptric lens arrangements and particularly to arrangements of such sort used to direct wave-propagated energy.

For convenience, the following definitions will be used in connection with the catoptric lens arrangements referred to hereinafter.

a. focal curve — the locus of the focal point of a generatrix of a reflecting surface when such generatrix is moved relative to a reference line; if the generatrix is rotated, or nutated, about an axis of symmetry not passing through the focal point, the focal curve may be referred to as a focal circle or focal arc; if the generatrix is translated with respect to its axis of symmetry, the focal circle may be referred to as a focal line;

b. meridional plane — any cross-sectional plane passed through nonparallel reflecting surfaces having a common axis of symmetry in a manner that such common axis and the normal to the reflecting surfaces at any point on the lines of intersection between the cross-sectional plane and nonparallel reflecting surfaces lie in the cross-sectional plane; if the reflecting surfaces themselves are divergent planes, any cross-sectional plane orthogonal to both reflecting surfaces and to the intersection between such surfaces is a meridional plane;

c. nonmeridional plane — any cross-sectional plane passed through nonparallel reflecting surfaces having a common axis of symmetry to intersect such axis at a point, all of the normals to the reflecting surfaces along the lines of intersection between such cross-sectional plane and such nonparallel reflecting surfaces not lying in such plane;

d. reflection plane — any plane defined by a ray incident on a reflecting surface and the normal to such surface at the point of incidence; if any particular reflection plane is coincident with a meridional plane, all rays in that reflection plane may be referred to as meridional rays and if any particular reflection plane is coincident with a nonmeridional plane, all rays in that reflection plane may be referred to as nonmeridional rays;

e. ideal ray — any ray that actually or apparently originates at, or is (after reflection) directed toward, a focal point or a focal curve of a reflecting surface; if the generatrix of the reflecting surface is a parabola, such a curve is hereinafter deemed to have an imaginary focal point, or focal curve, at infinity;

f. meridional plane aberration — the angular difference, in any meridional plane, between an ideal ray reflected from a point on a reflecting surface and any meridional ray reflected from the same point;

g. nonmeridional plane aberration — the angular difference, measured in any reflection plane coincident with a nonmeridional plane, between an ideal ray reflected from a point on a reflecting surface and any nonmeridional ray in that reflection plane and reflected from the same point;

h. Rambauske mirrors — at least a pair of mirrors wherein the generatrices of the reflecting surfaces are sections of curves having a focal point moved relative to a reference line to cause the locus of each one of the focal points to be a focal curve as defined hereinbefore; in a catoptric lens arrangement, two, or more, Rambauske mirrors may be positioned so that their focal curves are coincident, i.e. confocal, or spaced one from another in a predetermined manner.

It is known in the art that a catoptric lens arrangement may be utilized to direct substantially coherent wave-propagated energy, as light in a beam from a laser, in any desired manner (within limits imposed by the effects of diffraction arising out of the finite dimensions of the exit aperture of such an arrangement). Thus, as described in detail in the copending U.S. application of Werner R. Rambauske, entitled "Catoptric Lens Arrangement," Ser. No. 244,393, filed Apr. 17, 1972, (which application is assigned to the same assignee as this application) various diffraction-limited catoptric lens arrangements are shown. The just-cited application shows that a catoptric lens arrangement incorporating at least two confocal Rambauske mirrors may direct a laser beam, or a beam of any type of wave-propagated energy. In particular, the cited application shows that the Rambauske confocal mirrors may have reflecting surfaces whose generatrices are portions of any quadratic conic sections (excepting the circle) rotated or nutated about axis of symmetry not containing both focal points of the selected curve. (As noted hereinbefore in the definition of an ideal ray, if the generatrix is a portion of a parabola, a virtual focal point at infinity may be deemed to be the second focal point). All rays in a beam from an ideal source of coherent wave-propagated energy positioned at one focal point of the entrance mirror in such an arrangement are, therefore, ideal rays which are directed without aberration by such an arrangement.

As noted, the catoptric lens arrangement shown in the cited application is used to direct the rays in a beam from a laser. While such a device may ordinarily be considered to be a completely coherent source, i.e. a point source producing a narrow beam, it is self-evident that a completely coherent source is a physical impossibility. That is, some of the rays from even a laser are not ideal rays. Further, it is obvious that the positioning of a laser so that its beam apparently originates at a focal point of any catoptric lens arrangement may be difficult to achieve. Mispositioning of the laser adds to the deviation of the rays in the beam from ideal.

Fortunately, when a laser is used as a source of coherent light, even the aberrations (if such are significant) caused by the just-mentioned anomalies may be substantially reduced by adjustment of any catoptric lens arrangement using Rambauske mirrors. That is, as described in the cited application, the relative positions of the Rambauske mirrors may be adjusted so that their focal curves are not coincident, but rather are spaced apart along the line between the coherent source and such mirrors. With proper spacing between such mirrors, at least "narrow field" aberrations, i.e. spherical aberration and coma, may be significantly reduced to attain diffraction-limited operation. This is so even though the source may be not perfectly coherent or positioned.

While the just-mentioned method of compensating for narrow field aberrations is effective when light from an almost completely coherent source, as a laser, is passed through any known catoptric lens arrangement using Rambauske mirrors, a different situation obtains when light from an extended source, as an incandescent or a fluorescent lamp, is to be formed into a beam. That is, because the rays from each different point in an extended source are spatially different, the compensation technique used for eliminating (for all practical purposes) aberrations resulting from inherent characteristics or positioning of any known coherent source may not lead to totally successful results when light from an extended source is to be corrected for aberrations.

When light from an extended source, as a luminescent filament in an incandescent lamp, is to be directed in a beam of any desired shape, it is well known to combine reflective and refractive lens elements to form such a beam. Thus, for example, conventional headlamps for automobiles usually incorporate the combination of a concave paraboloidal mirror and a refractive lens disposed over the exit aperture of such a mirror. An incandescent light is disposed as near the focal point of the concave paraboloidal mirror as possible. Light reflected from such mirror then is directed through the refractive lens, along with unreflected light from the incandescent light. Obviously, because the light finally passing through the refractive lens apparently originates at many different points, a simple refractive lens cannot properly direct all of such light. The refractive lens in a conventional headlamp, therefore, is made up of a number of lenslets, each covering a relatively small portion of the exit aperture of the concave paraboloidal mirror. With such design, each lenslet may be shaped and oriented so that the finally emergent light is directed generally in a desired direction.

Although an acceptable beam may be formed by a conventional automobile headlamp, many difficulties and shortcomings are experienced. For example, light falling on the junction between adjacent lenslets cannot be properly directed. Such light, if permitted a pass without change, contributes to glare in the eye of an observer; on the other hand, if redirected, such light contributes little, if any, illumination in the desired field. Further, because of the curvature of each lenslet, some of the light falling on the surface may be reflected back onto the paraboloidal mirror and, after further reflection, either contribute to glare or be lost. Finally, and probably most important from the point of view of the optical designer, the necessity of using many lenslets, each having its own axis of symmetry but required to redirect rays apparently originating at points on or off such axis, makes it manifest that the optimum design of each one of such lenslets may be, at best, a compromise design. That is, optimum design involves balancing the effects of incorrectible deficiencies, rather than increasing efficiency or providing a better beam.

SUMMARY OF THE INVENTION

It is, therefore, a primary object of this invention to provide an improved catoptric lens arrangement for forming a beam from the light emitted by a source of finite dimensions;

Another object of this invention is to provide an improved catoptric lens arrangement to redirect rays of light emitted by a source not coincidental with a focal point, or focal curve, of any element in such arrangement, such redirection being effective to cause redirected rays to appear to have originated near a focal point, or focal curve, of at least one element in such arrangement;

Another object of this invention is to provide an improved catoptric lens arrangement wherein rays of light, initially in any nonmeridional plane, are redirected so as to approach a meridional plane within such an arrangement;

Another object of this invention is to provide an improved catoptric lens arrangement wherein light is reflected a number, greater than one, of times between a pair of divergent reflecting surfaces so that such reflected light is redirected in an emergent beam; and Still another object of this invention is to provide an improved catoptric lens arrangement as just set forth, such arrangement incorporating Rambauske mirrors with divergent reflecting surfaces, the generatrix of such divergent reflecting surfaces being a portion of selected ones of a family of quadratic conic sections.

These and other objects of this invention are attained generally by providing an extended source of light and at least a pair of Rambauske mirrors with divergent reflecting surfaces, such source being disposed intermediate such surfaces so that all rays of light from such source are reflected, in passing toward an exit aperture defined by such surfaces, a plurality of times from each one of such surfaces, the direction of each ray emergent from the exit aperture thereby approaching the direction of an ideal ray.

BRIEF DESCRIPTION OF THE DRAWINGS

For a more complete understanding of this invention, reference is now made to the following description of the accompanying drawings, wherein:

FIG. 1A is a sketch, somewhat expanded, illustrative of any meridional plane of any of the catoptric lens arrangements shown in FIG. 1, such sketch showing the manner in which meridional rays are redirected to approach the direction of ideal rays.

DESCRIPTION OF THE PREFERRED EMBODIMENTS

Figure 1:
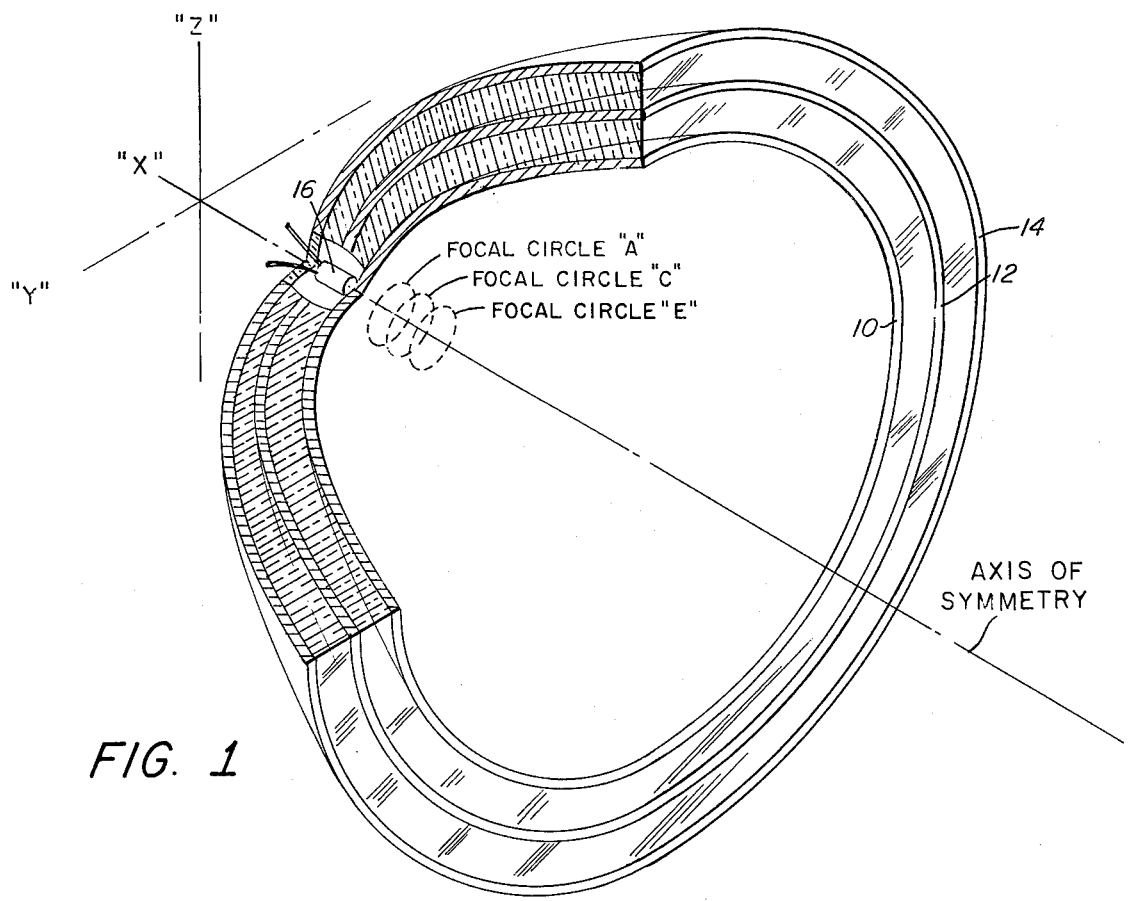
FIG. 1 is an isometric view, partially cut away, illustrating a catoptric lens arrangement according to this invention wherein sections of nonconfocal parabolas are used as the generatrices of the reflecting surfaces and rays from an incandescent filament may be redirected into a beam.

Referring now to FIG. 1, it may be seen that an embodiment of this invention includes a number of nonconfocal Rambauske mirrors 10, 12, 14 symmetrically disposed around an axis of symmetry, the focal curve of each one of such mirrors then being, as indicated, a different circle spaced along such axis. As may be more clearly seen in FIG. 1A, the generatrix for the reflecting surface of each one of the Rambauske mirrors 10, 12, 14 is a portion of a parabola, rotated about an axis of symmetry parallel to the common principal axis of the parabolas. Rambauske mirrors 10, 14 are, respectively, convex and concave. Both sides of Rambauske mirror 12 are reflective, so that a concave reflecting surface is opposite the convex reflecting surface of Rambauske mirror 10 and a convex reflecting surface is opposite the concave reflecting surface of Rambauske mirror 14. It is apparent, therefore, that the opposing reflecting surfaces of the Rambauske mirrors 10, 12, 14 are always divergent.

A light source 16, as an incandescent filament energized by any convenient electrical power source (not shown) is disposed along the axis of symmetry between the Rambauske mirrors 10, 14. It is noted here in passing that any conventional support structures may be used to position the Rambauske mirrors 10, 12, 14 and the light source 16; here it has been chosen to show such mirrors on the surfaces of nesting laminations of a transparent material, as glass. It should be noted, however, that the refractive properties of the transparent material are not essential to this invention.

Referring now to FIG. 1A, parabolas A, C and E may be deemed to be the curves from which the generatrices of the Rambauske mirrors 10, 12, 14 are selected. Parabolas B and D are curves from which the generatrices of auxiliary Rambauske mirrors (not shown in FIG. 1) may be selected. Exemplary rays from point sources $S_1$, $S_2$ are shown reflecting between various ones of the parabolas in FIG. 1A. Thus, the exemplary ray from $S_1$ is shown first to be reflected between parabolas A and C and then between parabolas B and C in passing to the exit aperture (not numbered) between the various parabolas. At each reflection point, the angle of reflection equals the angle of incidence, such angles being measured with respect to the normal at the reflection point. It will be observed that, once the exemplary ray passes beyond the semilatus rectums (not shown) of the parabolas, the angular difference between a line from any reflection point to the various focal points continuously decreases. That is, as the exemplary ray passes toward the exit aperture, aberration due to the displacement between the focal points $f_A, f_B, f_C, f_D, f_E$ decreases. At the same time the slope of the normal at each successive reflection point with respect to the principal axis increases asymptotically approaching 90°. It follows then that the direction of the finally reflected ray approaches the direction of an ideal ray. Similarly, the exemplary ray from $S_2$ is reflected back and forth (first between parabolas E and C and then between parabolas D and C) to finally emerge from the exit apertures.

As shown, the lengths of the parabolas A, B, C, D and E are progressively longer so that the last reflection point for any ray passing through the exit aperture is on a concave surface. It follows then that all rays from any point adjacent to the principal axis which pass through the exit aperture are directed in generally the same direction as an ideal ray reflected from a concave surface, i.e. generally parallel to the principal axis.

The principal of reciprocity may be applied to show that all rays (except ideal rays from a source such as $S_1$ or $S_2$) are reflected so as to be generally parallel to the principal axis. Thus, considering the ray shown entering between parabolas D and E, such ray may be deemed to be reflected back and forth between constantly converging surfaces. The slope of the normal at each successive reflection point is smaller and smaller. Therefore, the angle of incidence and the angle of reflection correspondingly decreases. Before the ray can reach the vertices of the parabolas, the angle of incidence reaches zero. The ray then is redirected back toward the exit aperture.

It will be evident from inspection of FIG. 1A that the aberration of any meridional ray finally emerging from the exit aperture is dependent upon the number of reflections undergone by such a ray in passing from a source to the exit aperture. The number of reflections, in turn, for any ray varies directly with the length of the parabolas and inversely with the distance between opposing parabolas. It will be obvious, however, that diffraction effects limit decreases in the spacing between opposing parabolas.

Referring again to FIG. 1 it may be seen that no ideal rays emanate from the light source 16. It will also be seen that, because of the orientation of the light source 16 with respect to the Rambauske mirrors 10, 12, 14, all rays from such source are meridional rays or, at worst, substantially meridional rays. That is, the most skewed reflection plane is almost a meridional plane. It follows then that, at worst, a relatively small nonmeridional plane aberration may be suffered by any ray. The reflections back and forth between the Rambauske mirrors 10, 12, 14 of an initially nonmeridional ray serve to reduce any non-meridional aberrations. Thus, as a ray in a reflection plane not initially coincident with a meridional plane is reflected back and forth between a pair of the Rambauske mirrors 10, 12, 14, the reflection plane asymptotically "precesses" toward a meridional plane. This means that, after a number of reflections, the nonmeridional aberration may be reduced to an insignificant amount.

Figure 2:
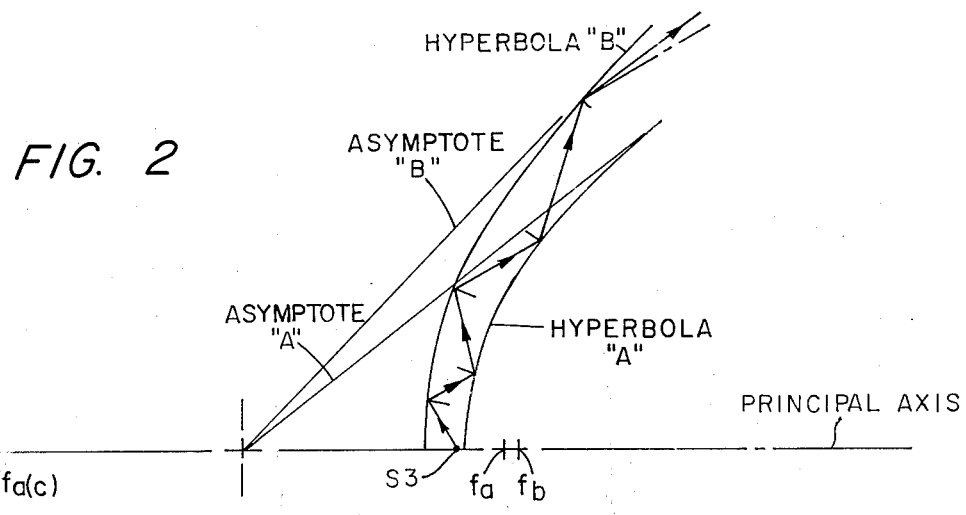
FIG. 2 is a sketch showing an alternative form of generatrices which may be used in place of those shown in FIG. 1A.

Referring now to FIG. 2, it may be seen that the generatrices of Rambauske mirrors according to this invention may be portions of nonconfocal hyperbolas. Thus, in FIG. 2 portions of hyperbolas A and B are shown, along with their focal points and portions of asymptotes. An exemplary ray from a source $S_3$ is shown reflecting back and forth between the illustrated portions of hyperbolas. In this case, as each successive reflection point is (after the first few) always further away from the focal points $f_A, f_B$ than the last preceding, the aberration due to the separation between such focal points is even less important than was the case with the curves shown in FIG. 1A. it will be noted that all rays (except initially ideal rays) from source $S_3$ out of the exit aperture (not numbered) apparently originate adjacent to either focal point $f_a$ or conjugate focal point $f_{b(c)}$. If it be desired that the rays originate at only one apparent source, the relative lengths of the hyperbolas may be changed. Further, if it be desired to increase the number of reflections undergone by any ray in passing from a source to the exit aperture, portions of additional hyperbolas may be used in the manner shown for the parabolas of FIG. 1A.

Having described a preferred embodiment of this invention, it will be apparent to one of skill in the art that many changes and modifications may be made without departing from our inventive concepts. Thus, so long as the contemplated Rambauske mirrors are arranged so as to subject all rays to many reflections in passing toward the exit aperture, the shape and position of the source may be changed within relatively wide limits. Further, the illustrated embodiments may be combined with conventional beam directing or focusing devices, whether such devices are catoptric, dioptric or catadioptric in nature. It is felt, therefore, that this invention should not be restricted to its disclosed embodiments, but rather should be limited only by the spirit and scope of the appended claims.

What is claimed is:

1. A catoptric lens arrangement for directing wave propagated energy from an extended source thereof, the arrangement comprising:
   a. at least a pair of divergent mirrors symmetrically disposed about an axis of symmetry to define a divergent channel for wave propagated energy, one mirror in each such pair having a convex reflecting surface and the other one having a concave reflecting surface, the generatrix of each one of such reflecting surfaces being a segment of a different parabola having a different focal point on a common principal axis spatially separated from the axis of symmetry and a different focal point, the generatrix of the convex reflecting surface being interposed between the divergent channel and the focal point of one of the reflecting surfaces; and b. an extended source of wave propagated energy disposed between the at least one pair of divergent mirrors adjacent to the axis of symmetry and spaced from both focal points of the generating parabolas.

2. A catoptric lens arrangement for directing wave propagated energy from an extended source thereof, the arrangement comprising:

a. at lest a pair of divergent mirrors symmetrically disposed about an axis of symmetry to define a divergent channel for wave propagated energy, one mirror in each such pair having a convex reflecting surface and the other one having a concave reflecting surface, the generatrix of each one of such reflecting surfaces being a segment of a different hyperbola having a different focal point on a common principal axis spatially separated from the axis of symmetry and different focal points, the generatrix of the convex reflecting surface being interposed between the divergent channel and the focal point of one of the reflecting surfaces; and b. an extended source of wave propagated energy disposed between the at least one pair of divergent mirrors adjacent to the axis of symmetry and spaced from both focal points of the generating hyperbolas.

* * * * *